United States Patent [19]

Kumar et al.

[11] Patent Number: 5,695,712
[45] Date of Patent: Dec. 9, 1997

[54] METHOD OF PRODUCING TILES FROM BEACH SAND GARNET

[75] Inventors: Amitabha Kumar; Goutam Banerjee; Dinesh Kumar Das; Nar Singh; Santosh Kumar Haldar, all of Calcutta, India

[73] Assignee: Council of Scientific and Industrial Research, New Delhi, India

[21] Appl. No.: 676,025

[22] Filed: Jul. 5, 1996

[30] Foreign Application Priority Data

Sep. 29, 1995 [IN] India ............... 1797/DEL/95

[51] Int. Cl.⁶ ............................................. C04B 33/32
[52] U.S. Cl. ........................ 264/655; 264/660; 264/678; 264/680; 264/DIG. 31; 501/144
[58] Field of Search ..................... 264/56, DIG. 31, 264/655, 678, 660, 680; 501/144

[56] References Cited

U.S. PATENT DOCUMENTS

| | | | |
|---|---|---|---|
| 1,567,091 | 12/1925 | Tone | 501/144 |
| 2,215,215 | 9/1940 | Garbisch | 501/144 |
| 5,275,989 | 1/1994 | Salge | 501/144 |

FOREIGN PATENT DOCUMENTS

| | | | |
|---|---|---|---|
| 1290844 | 9/1972 | United Kingdom | 501/144 |

*Primary Examiner*—James Derrington
*Attorney, Agent, or Firm*—Dickstein Shapiro Morin & Oshinsky LLP

[57] ABSTRACT

This invention relates to synthetic granite tiles made essentially from garnite sand and a process for the production of synthetic garnite tiles essentially from garnet sand which is a by-product of beach sand from rare earths extraction, said process comprising mixing beach sand garnet, feldspar and clay thoroughly; pressing the mixture using a press at a pressure in the range of 40–80 MPa to form tiles of desired shapes and sizes; drying the tiles so formed at a temperature of 100°–120° C.; firing the dried tiles at a temperature in the range of 1050°–1250° C. with a soaking for a period ranging from 1.5 to 2.5 hours, and polishing the resultant tiles.

6 Claims, No Drawings

METHOD OF PRODUCING TILES FROM BEACH SAND GARNET

FIELD OF THE INVENTION

This invention relates to synthetic granite tiles made essentially from garnite sand and a process for the production of synthetic garnite tiles essentially from garnet sand which is a by-product of beach sand from rare earths extraction.

BACKGROUND OF THE INVENTION

Ceramic materials, for example, dense alumina and silicon carbide, offer attractive applications as hard abrasion resistant materials. The utility of such hard abrasion resistant materials have been proven through use in abrasives, abrasion resistant linings, tooling and other advanced applications. The application area of abrasion resistant materials has widen in recent years to control erosion of flooring, reduce maintenance and down time in conveyors, charging chutes, dust collectors and in pneumatic conveying. Hard materials like zircon, garnet and various carbides with particle hardness over 1000 kg/mm$^2$ cause erosion of the order of 10 g/metric ton of material in pneumatic conveying at the mild steel belt. Substitutes for such applications are in great demand.

The use of known ceramic abrasion resistant material, though on the rise, is limited by economic factors since most hard ceramics require quality precursor materials at high temperature processing. An alternative to this situation is in demand and requires the design of a new class of materials which is easy to manufacture, requires cost effective precursors and processing with sufficient and properties to meet the challenge.

SUMMARY OF THE INVENTION

To meet the above challenges, the present invention provides synthetic garnite tiles essentially made from beach sand garnet which is a by-product of beach sand processed from rare earths extraction and a process for producing the synthetic garnite tiles.

DETAILED DESCRIPTION OF THE INVENTION

Accordingly, the present invention provides synthetic garnite tiles produced from processed beach sand garnet.

The invention also relates to a process for the production of synthetic garnite tiles from beach sand garnet, which comprises:

i. mixing beach sand garnet, feldspar and clay thoroughly, ii. pressing the mixture using a press at a pressure in the range of 40–80 MPa to form tiles of desired shapes and sizes, iii. drying the tiles so formed at a temperature of 100°–120° C., iv. firing the dried tiles at a temperature in the range of 1050°–1250° C. with a soaking for a period ranging from 1.5 to 2.5 hours, and v. polishing the resultant tiles by conventional methods.

In a preferred aspect of the invention, the amount of beach sand garnet used ranges from 50 parts to 60 parts by weight; the amount of feldspar used ranges from 20 to 25 parts by weight and the amount of clay used ranges from 20 to 25 parts by weight.

In addition, the invention envisages addition of additives such as $TiO_2$, $MnO_2$ and borax with the mixture for imparting appropriate gloss to the tiles and the preferred amounts of such additives may range from 2 to 4 percent $MnO_2$, 12 to 18 percent $TiO_2$ sludge and 0.2 to 0.8 percent borax by weight.

The various steps performed in the present process such as mixing, pressing, drying, firing and polishing are done in any one of the conventional methods. However, preferably, in the present process, the step of firing is being effected with soaking period ranging from 1.5 hrs to 2 hrs which eliminates formation of holes in the tiles, the step of sintering of the tiles is being performed at a temperature between 1050°–1250° C. and the step of polishing is being effected by employing a rotating disc in the presence of carborundum powder of different grade on a cast iron rotating.

Garnet sand available from beach sands in India as a by-product during rare earths extraction has now been identified as a possible raw material to fabricate such abrasion resistant material.

Garnets are a family of ternary silicates with the general formula $A_3B_2(SiO_4)_3$. These materials are found in nature in metamorphic rocks. However, of interest, here are the deposits formed due to the non-erodable nature of garnets, namely placer deposits of detrital origin. The hardness of garnets vary from 6.5 to 7.5 on the Mohs Scale and this, coupled with the high density results in well defined grains that are found in sediments. The beaches of Australia and India are among the gifted ones with such places of deposits. In India, the Indian rare earths Limited has benefication plants in South-Western of India and Western Coasts of India to collect garnet and produce at least 15000 tons/year. Significantly, higher amounts can be produced in India if utilisation routes can be developed. However, the utilisation of these garnet sands is limited to sand blasting as a substitute for silica to reduce danger of Silicosis polishing media for glass and soft metals, in electronics and semiconductor industry, and as heavy filter bed media. The use as an abrasive on cloth or bonded wheels is also known. As mentioned, garnets have the general formula $A_3B_2(SiO_4)_3$; where A is a divalent cation such as Mg, Fe, Ca, Mn; B is a trivalent cation Al, Fe, Ti, Cr, while Si may be replaced by Ti in small amounts.

The chemical analysis and particle size distribution of beach sand garnet is indicated below:

TABLE 1

| Chemical Analysis of Beach Sand Garnet | |
|---|---|
| Constituent (Oxides) | Wt % |
| $SiO_2$ | 36.15 |
| $Al_2O_3$ | 19.09 |
| $TiO_2$ | 0.57 |
| $Fe_2O_3$ | 32.87 |
| CaO | 3.41 |
| MgO | 7.22 |
| Undetermined ingredient | 0.40 |
| L.O.I(loss on ignition at 1000° C.) | 0.29 |

TABLE 2

| Particle size distribution of Beach Sand Garnet as received | |
|---|---|
| Size (mm) | Wt % |
| 1150 | 0.10 |
| 600 | 0.15 |
| 300 | 63.25 |
| 150 | 100.00 |

Garnets are classified as two families namely Pyralspites and Ugrandites. The detrital beach sand garnets of India are almandite-pyrope solid solution and probably with some Ca in the divalent site also. These iron rich garnets are readily fusible but melt incongruently with approximately 25% volume increase.

The invention also provides a new process for the production of synthetic garnite tiles employing processed beach sand garnet as major constituent and the tiles of the present process have been termed as "garnite tiles". The chemical analysis and particles size distribution of garnet sand has been given in Tables 1 & 2 of the present description. The other raw materials used in this process are indicated below.

Feldspar: The chemical constituents of feldspar are silica ranging from 66–67 by weight, alumina ranging from 16–20 by weight, Calcia and magnesia from 0.5 to 0.1 by weight and $K_2O$ ranging from 14–15% by weight. Loss on ignition varies from 0.2–0.5% by weight.

China Clay : The chemical constituents of china clay are silica ranging from 46 to 48% by weight, alumina ranging from 35 to 38% by weight, ferric oxide ranging from 0.8 to 1.2 by weight, titanium oxide ranging from 0.8 to 1.2% by weight, magnesium oxide in trace, calcium oxide and potassium oxide each is about 0.5 to 1.5% by weight, loss on ignition between 10 to 13% by weight.

As regards the composition of "granite tiles", the applicants give below the composition of the 3 types of tiles mentioned in the following description of the specification:

|  | Original garnet sand 50% + Feldspar 25% + Rajmahal clay 25% marked - "0" | Composition Marked "0" + 6% $MnO_2$ | Composition Marked "0" + 15% Titania sludge |
| --- | --- | --- | --- |
| % $SiO_2$ | 46.74 | 49.81 | 46.59 |
| % $Al_2O_3$ | 25.91 | 22.95 | 25.12 |
| % $Fe_2O_3$ | 17.24 | 16.22 | 15.36 |
| % $TiO_2$ | 1.22 | Traces | 3.41 |
| % CaO | 1.41 | 1.41 | 2.07 |
| % MgO | 3.89 | 4.06 | 3.12 |
| % MnO | — | 1.67 | — |
| % $K_2O$ | 2.75 | 2.75 | 3.09 |
| % $Na_2O$ | 0.70 | 0.59 | 0.74 |
| % loss of ignition | 0.14 | 0.12 | 0.50 |

The preferred process is now described herebelow under mixing, pressing, firing and polishing steps.

MIXING

The iron rich beach sand garnet being very hard is subjected to grinding in a ball mill for a period between 18–24 hrs. to bring down the fineness to 10–40μ. A composition consisting of 20–30 percent feldspar and 20–30 percent clay, 40–60 percent garnet sand, 0.5 percent borax with and without maganese dioxide 2–3 percent or titania slag 12–18 percent is allowed to further grinding for a period of 8–10 hrs. to have an intimate mixture. The total mix is then transferred to filter press to reduce the moisture content from 40–50 percent to 12–16 percent.

PRESSING THE MIX TO FORM THE TILES

The mix from the filter press is either air dried or oven dried so that the moisture content of the mix is brought down to 4–6 percent and then subjected to pressing action to desired shape of size 100×100 mm, 150×150 mm, 300×300 mm tiles of 8–10 mm thickness or so with a pressure between 40–50 MPA. The tiles thus formed are dried in a drier at a temperature between 100°–120° C., preferably 105°–115° C. by allowing waste heat from the furnace.

FIRING OF THE GREEN TILE

Firing of the tiles thus formed is done in both electrical and oil fired furnaces. Sintering temperature is very critical. The specified hours of soaking eliminates the formation of holes by sealing from adjacent semisolid mass. The sintering of the mass takes place within short variation of temperature usually between 1050° C. to 1250° C. The soaking usually depends upon the thickness of the tiles and ranges between 1.5 hr to 2.5 hrs.

POLISHING OF THE TILES

It is possible to polish the fired tiles by grinding on cast iron rotating disc in presence of carborundum powder of different grade. However, a mirror finish can be given to the tiles by grinding on a cast, iron rotating disc lined with a thick and hard felt with fine abrasive powder solution/paste.

Polishing can also be effected with a resin bonded diamond wheel provided in a motorable fixtures to hold number of tiles at a time, as well as, standard machine for polishing granite tiles could also be used.

The invention will now be described with the help of following examples. However, these examples should not be considered as to limit the scope of the invention.

EXAMPLE 1

200 kg Batch 100 kg beach sand garnet is ground in a ball mill for 24 hrs. and then allowed to dry in a drier after decantation of surplus water.

Feldspar and clay are ground separately in a jaw cure roller crusher and then put in an edge runner such that all materials are passed through 20 mesh sieve. 50 kg of ground Feldspar and 50 kg of ground clay are mixed with 100 kg ground garnet sand. The total batch is then put in a ball mill with 50 percent water and allowed to grind for another period of 8 to 10 hrs. The resultant mix is then taken out and decanted before putting the materials in drier for complete drying. The dried batch mix is provided with 4–6 percent water and aging is done for 24 hrs. before the pressing action. The mix is then formed into shapes of tiles 100×100 mm with a pressure of 40 tons. The tiles are then dried at a temperature of 110°–115° C. after air dried for 24 hrs. The dried tiles are then placed in an electric furnace temperature between 1100° to 1250° C. with 1.5 hrs. soaking and natural cooling. The high abrasion resistant tiles thus made are polished in rotating east iron disc in cast presence of carborundum powder of 60, 80 and 100 grade separately. The tiles showed high gloss reddish brown colour with a few small holes.

EXAMPLE 2

200 kg Batch 120 kg beach sand garnet is ground in a ball mill for 24 hrs. and then allowed to dry in a drier after decantation of surplus water. Feldspar and clay are ground separately in a jaw cum roller crasher and then further ground in an edge runner so that all the materials are passed through 20 mesh sieve.

40 kg of ground feldspar and 40 kg of ground clay are mixed with 120 kg ground garnet sand by any known methods, such as by hand. The total batch is then put in a ball mill with 50 percent water and allowed to grind for another period of 8 to 10 hrs. the resultant mix is taken out from the ball mill and allowed to settle. After removing the water from the top, the mix is then put in a drier for complete drying.

The dried batch mix is mixed with 4–6 percent water and aged for 24 hrs. and then subjected to pressing action to form 100×100×8 mm tiles with 40 tons pressure. After the tiles are dried in a drier, these are placed in an electric furnace for sintering at a temperature between 1100°–1200° C. with 1.5 hours soaking followed by natural cooling. The tiles thus formed being of high strength is polished by help of 60, 80 and 100 grade carborundum powder in a rotating cast iron disc separately for different grade of carborundum powder. Resulting tiles of reddish brown colour having small holes but with larger number than in examples but with high gloss and more abrasive resistant than example 1.

EXAMPLE 3

200 kg batch 100 kg beach sand garnet is ground in a ball mill for 20 hrs. and then allowed to dry in a drier after separating the water from top on sedimentation.

Feldspar and clay are ground separately in a jaw crusher cum roller crusher and then put in an edge runner to sieve through 20 mesh sieve.

50 kg of ground feldspar and 50 kg of ground clay, 100 kg of ground beach sand garnet, 30 kg titania sludge are mixed and ground in a ball mill with 50 percent water for 8–10 hrs. The resultant mix is allowed to settle. After removing the water from top, the mixture is then dried in a drier. The dried batch mix is moistened with 4–6 percent moisture before pressing. The tiles of shape 100×100×8 mm are pressed with 40 tons pressure and allowed to dry at a temperature in the range of 110° C. to 115° C. The dried tiles are sintered in an electric furnace at a temperature 1100°–1200° C. with 2 hrs. soaking followed by natural cooling The resultant high abrasive tiles are of yellowish in colour without any holes and are of sufficient gloss after polishing with carborundum powder of grade 60, 80 and 100. Grinding done separately for different grade carborundum powder in cast iron rotating disc.

EXAMPLE 4

200 kg batch 100 kg beach sand garnet is ground in a ball mill for 20 hrs. and then allowed to dry in a drier after separating the water from top on sedimentation.

Feldspar and clay are ground separately in jaw crusher cum roller crusher and then further ground in an edge runner to allow the materials to pass through 20 mesh sieve.

50 kg ground feldspar, 50 kg ground clay, 100 kg ground garnet sand, 5 kg manganese dioxide are mixed in a manner known per se such as hand mixed and sieved through 10 mesh sieve before grinding further for a period of 8–10 hours in a ball mill. The resultant mix is then collected in a container and allowed to settle. After removing the water from top, the mass is then dried in drier. The dried batch mix is moistened with 4–6 percent moisture. The batch mix is then shaped into tiles of size 100×100×8 mm with 40 tons pressure and allowed to dry in a drier at temperature of 105° C. The dried tiles are sintered in an electric furnace at a temperature 1050°–1150° C. with 1.7 hrs. soaking followed by natural cooling The resultant high abrasive tiles are blakish colour without any flaws and having sufficient gloss after polishing under carborundum powder of 60, 80 and 100 grade. Grinding is done separately for different grades carborundum powder.

EXAMPLE 5

200 kg batch 100 kg. beach sand garnet is ground in a ball mill for 20 hours, and then dried in a drier after separating the water from top on sedimentation.

Feldspar and clay are ground separately in a jaw crusher mm roller crusher and then further ground in an edge runner to pass the materials through 20 mesh sieve.

50 kg of ground feldspar, 50 kg of ground clay, 100 kg of ground garnet sand, 30 kg titania sludge waste and 500 gm borax are mixed thoroughly and passed through 10 mesh sieve before fed the materials in a ball mill for further grinding for a period of 8–10 hrs. The resultant mass is collected in a drum and allowed to settle. After removing the water from top, the batch is dried at a temperature selected from 100°–110° C. The dried batch mix is moistened with 4–6 percent moisture and formed into tiles of size 100× 100×8 mm and 100×100×10 mm on application of pressure between 40 and 60 tons, respectively. The tiles are then dried in a drier at 110°–115° C. The dried tiles are sintered at a temperature between 1050°–1150° C. with 2 hours soaking followed with natural cooling.

The resultant high abrasive tiles are of yellowish in colour without any flaws. Tiles are made smooth and polished carborundum powder of 60, 80 and 100 grade. Additional polishing done to give minor finish with calcined alumina powder over hard woolen felt pasted on cast iron rotating disc.

EXAMPLE 6

200 kg batch 100 kg beach sand garnet is ground in a ball mill for 20 hrs.

Feldspar and clay are ground separately in a jaw crushers cam roller crusher and then further ground in an edge runner to pass through 20 mesh sieve.

100 kg ground beach garnet as stated above are further mixed with 50 kg of ground feldspar, 50 kg of ground clay and 50 kg titania oxide in a ball mill for grinding and intimate mixing for further 8–10 hrs. The batch mix is then taken into the filter press. The caked batch mix containing moisture around 18–24 percent are dried to 8–10 percent by air drying and subjected to pressing action. The tiles are formed of size 100×100×8 and 150×150×10 mm with a pressure of 30 to 60 tons, respectively. The tiles are then dried in a drier at a temperature between 110°–115° C. The dried tiles are sintered in an oil fired furnace at a temperature of 1100°–1150° C. with 2 hrs. soaking. 200 tiles are fired at a time. The resultant tiles are highly abrasive. The tiles are polished with carborundum powder of grade 60, 80 and 100 separately. The tiles are then polished to mirror finish with calcined alumina in an woolen felt pasted in rotating cast iron disc.

EXAMPLE 7

Small pallets of composition as per Example 1 are made by hand pressing which are arranged in a regular shape during pressing. The batch mix of Example 3 are put under the mold over the regular oriented pallets and are pressed to form tiles with size 100×100×8 mm with application of 40 tons pressure. The tiles are then dried in a drier at a temperature between 110°–115° C. The tiles are sintered in an oil fired furnace at a temperature 1100°–1200° C for 20 hours with 2 hrs. soaking followed by natural cooling. Tiles are polished with carborundum powder medium of grade 60, 80 and 100 separately. The tiles are then polished in hard woolen felt with calcined alumina powder. The resulted tiles are of mosaic finish of high gloss.

The granite tiles prepared as described above have abrasion resistant, high MOR values ranging between 20–30

Mpa, water absorption capability ranging between 0.06 to 0.030. Bulk density ranging between 2.782 to 2.835. App. Specific gravity of the materials ranging between 2.77 to 2.80. Abrasion resistance measured as per BS 1902 part. 1A (1986) is 0.16 to 0.20. Apparent porosity ranging from 0 to 0.8, cold crushing strength ranging between 70–80 MPa.

Advantages of this invention

1. The present novel process of manufacturing tiles from beach sand garnet after extracting rare earth oxides leads to solve the disposal problems of 15,000 tons/year of by-product beach sand garnet. There is at present very little utilisation of the garnet sand in the industries.

2. The process of the invention employing beach sand garnet as major raw material, which will enable to meet the increasing demand of the decorative granite tiles for providing in bathroom, kitchen and hospital buildings.

3. The process is environmental friendly and can replace natural granite tiles which are being produced by destroying hills and mountains causing imbalance in the ecology of the society.

4. The product of the present process is much cheaper than the high selling price of granite tiles, marble tiles and glazed ceramic tiles which are being used presently.

5. The "granite tiles" prepared from beach sand garnet having nearly zero porosity and zero water absorption property and hence, these tiles perform better than other ceramic tiles and will be more durable, free from formation of moss while in use in place of continuous flow of water.

6. The "granite tiles" prepared from beach sand garnet provide a dust proof and easy-to-clean surface due to its high finish glossy surface.

We claim:

1. A process for production of synthetic garnite tiles from beach sand garnet comprising:

i. mixing beach sand garnet, feldspar and clay thoroughly to prepare a mixture, ii. pressing the mixture using a press at a pressure in the range of 40–80 MPa to form tiles of desired shapes and sizes, iii. drying the tiles so formed at a temperature of 100°–120° C., iv. firing the dried tiles at a temperature in the range of 1050°–1250° C. with a soaking for a period ranging from 1.5 to 2.5 hours, and v. polishing the fired tiles.

2. A process as claimed in claim 1 wherein the amount of beach sand garnet used ranges from 50 parts to 60 parts by weight; the amount of feldspar used ranges from 20 to 25 parts by weight and the amount of clay used ranges from 20 to 25 parts by weight.

3. A process as claimed in claim 1 wherein the mixture contains an additive selected from the group consisting of $TiO_2$, $MnO_2$ and borax for imparting appropriate gloss to the tiles.

4. A process as claimed in claim 3 wherein the additives are present in an amount ranging from 2 to 4 percent $MnO_2$, 12 to 18 percent $TiO_2$ sludge and 0.2 to 0.8 percent borax by weight.

5. A process as claimed in claim 1 wherein the firing is effected with a soaking period ranging from 1.5 hrs to 2 hrs which eliminates formation of holes in the tiles.

6. A process as claimed in claim 1 wherein the polishing is effected by grinding said synthetic garnite tiles on a cast iron rotating disc in the presence of carborundum powder of fine grade where said carborundum powder is located between said cast iron rotation disc & said synthetic garnite tile.

* * * * *